(12) United States Patent  
Sato et al.

(10) Patent No.: US 7,344,423 B2
(45) Date of Patent: Mar. 18, 2008

(54) TERMINAL MEMBER TO BE CONNECTED FOR CELL VOLTAGE-MEASURING USE

(75) Inventors: Masahiko Sato, Utsunomiya (JP); Toshiaki Ariyoshi, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/047,437

(22) Filed: Jan. 28, 2005

(65) Prior Publication Data

US 2005/0142417 A1 Jun. 30, 2005

Related U.S. Application Data

(62) Division of application No. 10/126,225, filed on Apr. 19, 2002, now Pat. No. 6,933,069.

(30) Foreign Application Priority Data

Apr. 20, 2001 (JP) ............................. 2001-123520
Jun. 5, 2001 (JP) ............................. 2001-169356

(51) Int. Cl.
 *H01R 13/02* (2006.01)
(52) U.S. Cl. ..................................................... 439/884

(58) Field of Classification Search ......... 439/884–889
See application file for complete search history.

(56) References Cited

U.S. PATENT DOCUMENTS 2,727,110 A * 12/1955 Von Hoorn ................. 337/165
6,083,059 A * 7/2000 Kuan ......................... 439/862
6,410,176 B1 6/2002 Genc et al.

FOREIGN PATENT DOCUMENTS

JP 09-283166 10/1997
JP 11-339828 12/1999
JP 2000-223141 8/2000

* cited by examiner

*Primary Examiner*—Briggitte R. Hammond
(74) *Attorney, Agent, or Firm*—Lahive & Cockfield, LLP; Anthony A. Laurentano, Esq.

(57) ABSTRACT

A fuel cell stack comprising a plurality of fuel cell units stacked via separator plates, which further comprises (a) voltage-measuring projection terminals on peripheries of the separator plates, (b) a plurality of terminal members connected to voltage-inputting terminals of a voltage-measuring apparatus, and (c) an insulating casing comprising a plurality of partitions for supporting each terminal member in an insulated state.

5 Claims, 14 Drawing Sheets

TERMINAL MEMBER TO BE CONNECTED FOR CELL VOLTAGE-MEASURING USE

RELATED APPLICATIONS

This application is a divisional application of U.S. Ser. No. 10/126,225 filed Apr. 19, 2002, now U.S. Pat. No. 6,933,069, which claims priority to Japanese Patent Application No. 2001-123520 filed Apr. 20, 2001 and Japanese Patent Application No. 2001-169356 filed Jun. 5, 2001.

FIELD OF THE INVENTION

The present invention relates to a terminal member for connecting projection terminals on peripheries of separator plates and voltage-inputting terminals of a voltage-measuring apparatus in a fuel cell stack, and a fuel cell stack comprising such terminal members, particularly to a terminal member capable of absorbing the unevenness of the positions of separator plates in a stack direction to surely connect projection terminals on peripheries of separator plates and voltage-inputting terminals of a voltage-measuring apparatus, and a fuel cell stack comprising such terminal members.

PRIOR ART

As shown in FIG. 24, a fuel cell stack has a structure in which a plurality of cells are stacked, each cell comprising a membrane electrode assembly 101 comprising an electrolyte membrane 111 and electrodes 112 formed on both surfaces thereof, and a pair of separator plates 121 disposed on both surfaces thereof. Each separator plate 121 is provided with hydrogen gas-flowing grooves on one surface opposing the membrane electrode assembly 101, and air-flowing grooves on the other surface. Each separator plate 121 is also provided on a periphery thereof with a projection terminal 122 as a terminal for outputting cell voltage.

To determine whether or not each cell constituting the fuel cell stack is in a normal state, the voltage of each cell is measured. The measurement of voltage of each cell is conventionally carried out by connecting voltage-measuring terminals of separator plates and voltage-inputting terminals of a voltage-measuring apparatus (usually mounted onto the fuel cell stack) by a harness (cable) having connectors on both sides.

For instance, Japanese Patent Laid-Open No. 9-283166 discloses a method for connecting voltage-measuring output terminals of a fuel cell stack, wherein a carbon plate of each cell of the fuel cell stack is provided with a round hole, which is connected to one end of an output terminal by a banana clip, and the other end of the output terminal is connected to a voltage-measuring apparatus via each connector.

Japanese Patent Laid-Open No. 11-339828 discloses a fuel cell stack with cell voltage-measuring terminals, the fuel cell stack comprising electrode units and separator plates for generating electricity by reacting a fuel gas based on hydrogen with oxygen or air in the electrode units, wherein voltage-measuring projection terminals are mounted to the end surfaces of the separator plates in perpendicular thereto.

Japanese Patent Laid-Open No. 2000-223141 discloses a fuel cell stack constituted by alternately stacking membrane electrode assemblies each comprising an electrolyte sandwiched by a fuel electrode and an oxygen electrode and separator plates, wherein voltage-measuring terminals in the shape of projection are mounted to the separator plates, and a plurality of voltage-measuring cords connected to the voltage-measuring terminals are connected to one-touch connectors fixed to pressure plates at both ends of the fuel cell stack.

However, because the fuel cell stack has a structure in which several tens to several hundreds of cells are stacked, it not only needs a lot of time and labor to mount connectors to each voltage-measuring terminal and each voltage-inputting terminal, but there is also likelihood that the connectors are detached from the terminals, and that the terminals are incorrectly connected. In addition, because a fuel cell stack mounted onto a vehicle is subjected to vibration, there are problems that connectors may be detached from the fuel cell stack by vibration, and that connectors may be entangled complicatedly.

Therefore, it is desired to connect a large number of voltage-measuring terminals of separator plates and voltage-inputting terminals of a voltage-measuring apparatus at a time without using a harness having connectors at both ends. However, because the fuel cell stack has a structure in which a large number of cells are stacked, the positions of projection terminals of separator plates each formed by a waved, thin metal plate are inevitably uneven in a stack direction, there is no sufficient position precision necessary for automatic operation. Further, because the fuel cell stack has difference in temperature between at a stop and during operation, the positions of separator plates in a stack direction may change by thermal expansion. Thus, with rigid connection, the connectors cannot follow displacement by thermal expansion, resulting in the likelihood of insufficient connection and excess stress applied to voltage-measuring terminals.

Further, because each cell is as extremely thin as about 2-3 mm in a fuel cell stack, particularly in a polymer electrolyte fuel cell stack, it is necessary to prevent connectors connected to the projection terminals of the adjacent separator plates from contacting with each other. However, it is extremely difficult to achieve insulation in connectors connected to the terminals of several tens to several hundreds of cells by a simple mechanism.

OBJECTS OF THE INVENTION

Accordingly, an object of the present invention is to provide a terminal member capable of surely connecting by one operation voltage-measuring projection terminals of a large number of thin metal separator plates and voltage-inputting terminals of a voltage-measuring apparatus in a fuel cell stack, and easily positioning them by absorbing unevenness and displacement in the positions of separator plates in a stack direction, if any.

Another object of the present invention is to provide a fuel cell stack comprising voltage-measuring projection terminals of a large number of thin metal separator plates and voltage-inputting terminals of a voltage-measuring apparatus, which are surely connected by terminal members, and each terminal member is surely insulated.

SUMMARY OF THE INVENTION

The integral terminal member of the present invention for connecting voltage-measuring projection terminals on peripheries of separator plates and voltage-inputting terminals of a voltage-measuring apparatus in a fuel cell stack comprises (a) a tip end portion to be connected to a projection terminal of the separator plate, (b) an elastic support portion constituted by narrow-width strip portions connected to the tip end portion, and (c) a fulcrum portion connected to the elastic support portion and to be connected to the voltage-inputting terminal. Because of a structure in which a tip end portion is connected to a fulcrum portion via such an elastic support portion, the terminal member of the present invention can surely connect voltage-measuring projection terminals of a large number of thin metal separator plates with voltage-inputting terminals of a voltage-measuring apparatus in a fuel cell stack by one operation, and it can easily position them by absorbing unevenness and displacement in the position of separator plates in a stack direction, if any. Also, because the voltage-measuring terminals and the voltage-inputting terminal of a large number of cells can be connected without a harness, it is possible to extremely save the time and labor for connection.

The terminal member of the present invention preferably has a substantially U-shaped cross section, whereby the tip end portion is connected to a projection terminal of the separator plate in a sandwiching manner, and the fulcrum portion is connected to the voltage-inputting terminal in a sandwiching manner. With this structure, connection to projection terminals of separator plates and connection to voltage-inputting terminals of a voltage-measuring apparatus can surely be achieved by one operation. Also, because the terminal member of this structure can be formed from an integral, thin metal plate by punching out a shape having a tip end portion, an elastic support portion and a fulcrum portion and folding it, it can easily be produced from one thin metal plate by punching. Further, because both tip end portion and fulcrum portion have a U-shaped cross section with one open side, pressure for contact with a projection terminal of a separator plate is small. Therefore, connection is easy when there are a large number of terminals.

The elastic support portion is preferably constituted by a plurality of curved strip portions. The curved strip portions has flexibility capable of absorbing deformation in every direction and sufficient elasticity, and it is easy to form a tip end portion and a fulcrum portion integrally from one thin metal plate by punching.

The fulcrum portion of the terminal member preferably has an opening at a fulcrum position. This opening is aligned with an opening of the voltage-inputting terminal of the voltage-measuring apparatus, with an insulating shaft such as a plastic rod penetrating both openings, so that it can function as a fulcrum when the terminal member is rotated and enables accurate positioning.

The opening of the fulcrum portion is connected to the opening of the voltage-inputting terminal of the voltage-measuring apparatus with an eyelet. With this structure, it is possible to prevent the terminal members from detaching from the terminals and deviating from the correct position, when the terminal members are rotated with the openings as a fulcrum. Further, this opening structure can achieve the reduction of space for the fulcrum portion and surely keep electric contact. Also, the open ends of the tip end portion and the fulcrum portion are preferably slightly expanded. With this structure, the voltage-measuring terminals and the voltage-inputting terminals can easily be inserted into the terminal members.

The fuel cell stack comprising a plurality of fuel cell units stacked via separator plates according to the present invention comprises (a) voltage-measuring projection terminals on peripheries of the separator plates, (b) a plurality of terminal members connected to voltage-inputting terminals of a voltage-measuring apparatus, and (c) an insulating casing comprising a plurality of partitions for supporting each terminal member in an insulated state. Thus, by supporting each terminal member by a plurality of partitions of the insulating casing, it is possible to surely prevent the adjacent terminal members from being brought into contact with each other. Because the insulating casing can support a plurality of terminal members simultaneously, the voltage-measuring projection terminals of a large number of thin metal separator plates can surely be connected to the voltage-inputting terminals of a voltage-measuring apparatus by one operation. Also, because the voltage-measuring terminals of a large number of cells can be connected to the voltage-inputting terminals without a harness, time and labor for connection can be extremely reduced.

The partitions of the insulating casing are preferably formed by a plurality of comb teeth. The insertion of a terminal member into each gap of a plurality of comb teeth can easily and surely achieve the positioning of the terminal member, and can surely prevent a plurality of terminal members from being in contact with each other.

The insulating casing is preferably constituted by an upper casing and a lower casing each having a plurality of comb teeth. The upper casing and the lower casing preferably have threaded holes for fastening them, one of the holes being a unidirectionally extended circular hole. With the insulating casing constituted by a combination of the upper casing and the lower casing, and with one of the threaded holes for fastening them being a unidirectionally extended circular hole, the position of the upper casing and the lower casing in a stack direction can be adjusted, thereby absorbing the differences in position between the voltage-measuring projection terminals of the separator plates and the voltage-inputting terminals of a voltage-measuring apparatus in a stack direction.

In one embodiment of the present invention, the comb teeth of the lower casing have open ends whose upper ends are closed. By using the lower casing of this structure, it is possible to rotate the terminal members simultaneously only by rotating the insulating casing in an opposite direction, thereby detaching all the terminal members.

Each of the voltage-inputting terminal and the fulcrum portion of the terminal member preferably has an opening at an alignment position. The opening of the terminal member not only functions as a fulcrum when the terminal member is rotated, but also can be used for the accurate positioning of the voltage-inputting terminal and the terminal member.

The fulcrum portion and the tip end portion of the terminal member preferably engage each comb tooth of the upper casing and each comb tooth of the lower casing, respectively, with the elastic support portion not substantially engaging any of the upper casing and the lower casing. With this structure, the differences in position between the voltage-measuring projection terminals of the separator plates and the voltage-inputting terminals of the voltage-measuring apparatus in a stack direction, if any, can be absorbed.

The fuel cell stack comprising a plurality of fuel cell units stacked via separator plates according to a preferred embodiment of the present invention comprises (a) a plurality of terminal members for connecting voltage-measuring projection terminals on the peripheries of separator plates and voltage-inputting terminals of a voltage-measuring apparatus, and (b) an insulating casing comprising a plurality of partitions for supporting each terminal member in an insulated state, wherein the voltage-inputting terminals are engaged to the terminal members, and the terminal members are engaged to the voltage-measuring terminals of the separator plates by rotating the casing around the voltage-inputting terminals as a fulcrum, whereby the voltage-inputting terminals are connected to the voltage-measuring terminals.

Particularly in the preferred embodiment, the fulcrum portions of the terminal members engaging the voltage-inputting terminals are engaged to the comb teeth of the upper casing, and the tip end portions of the terminal members are engaged to the comb teeth of the lower casing, whereby the tip end portions of the terminal members can be engaged to the voltage-measuring terminals of the separator plates by rotating the casing around the openings of the voltage-inputting terminals as a fulcrum. By rotating the casing, the tip end portions of the terminal members can be connected to the voltage-measuring terminals of the separator plates at a time, resulting in easy connecting process of the terminals.

DESCRIPTION OF THE PREFERRED EMBODIMENTS

Figure 1:
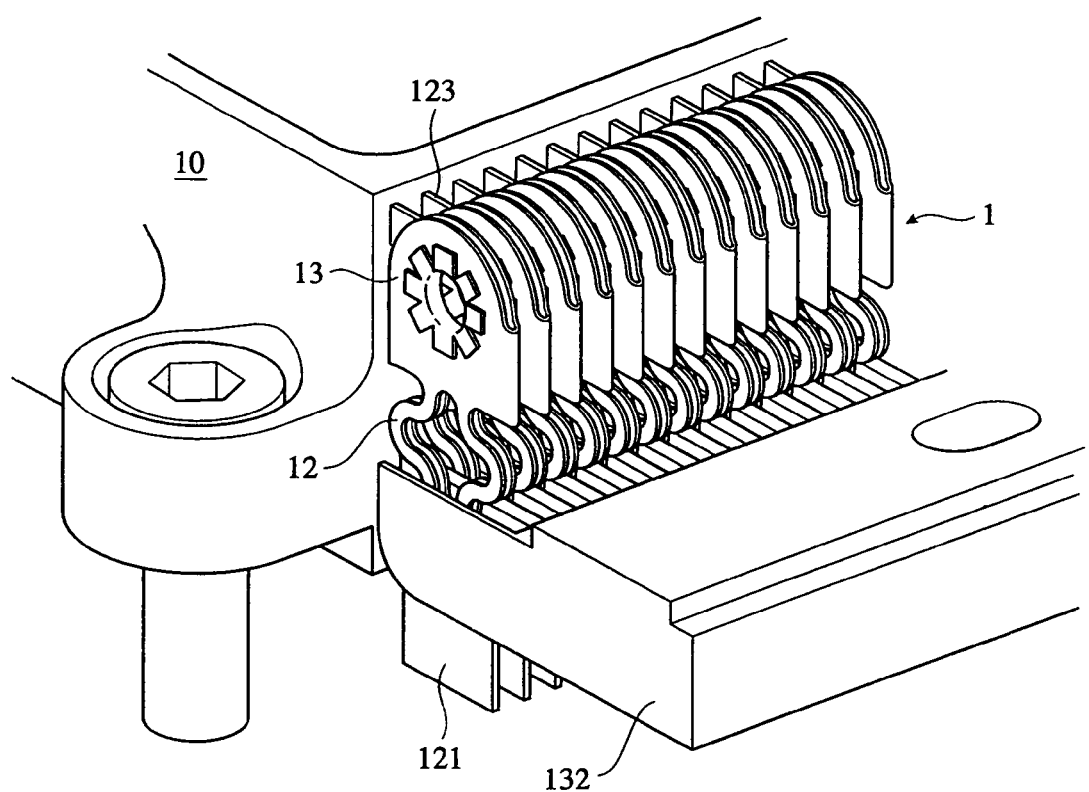
FIG. 1 is a partial perspective view showing a fuel cell stack comprising voltage-measuring terminals of separator plates and voltage-inputting terminals of a voltage-measuring apparatus, to which terminal members are connected with insulating casings.

To explain the overall structure of the fuel cell stack, FIG. 1 specifically shows a state where a voltage-measuring terminal (projection terminal) 121 of a separator plate (not shown) is connected to a voltage-inputting terminal 123 of a voltage-measuring apparatus 10 via a terminal member 1 supported by a casing (only a lower casing 132 is shown). A large number of separator plates have voltage-measuring projection terminals 121 at upper ends of the fuel cell stack on both lateral sides. A large number of projection terminals 121 on each side are divided to a plurality of groups, and the terminal members 1 connected to the projection terminals 121 in each group are received in one insulating casing 130.

Figure 2:
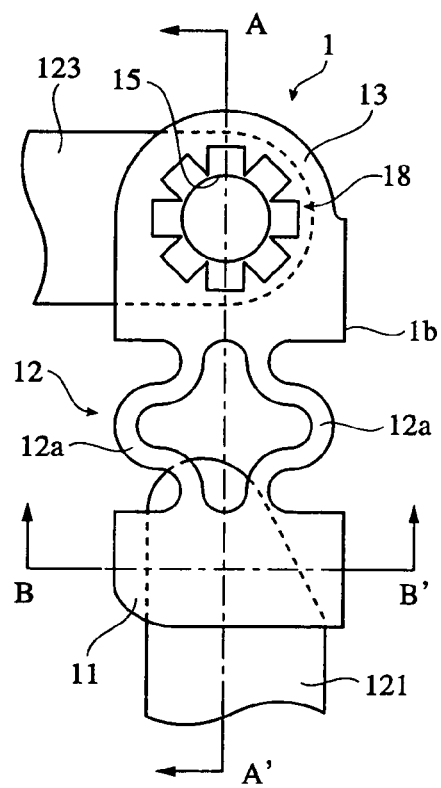
FIG. 2 is a front view showing a terminal member according to one preferred embodiment of the present invention.

As shown in FIG. 2, the terminal member 1 of the present invention comprises (a) a tip end portion 11 to be connected to a projection terminal of a separator plate, (b) an elastic support portion 12 constituted by narrow-width strip portions connected to the tip end portion 11, and (c) a fulcrum portion 13 connected to the elastic support portion 12, which is to be connected to a voltage-inputting terminal.

Figure 3:
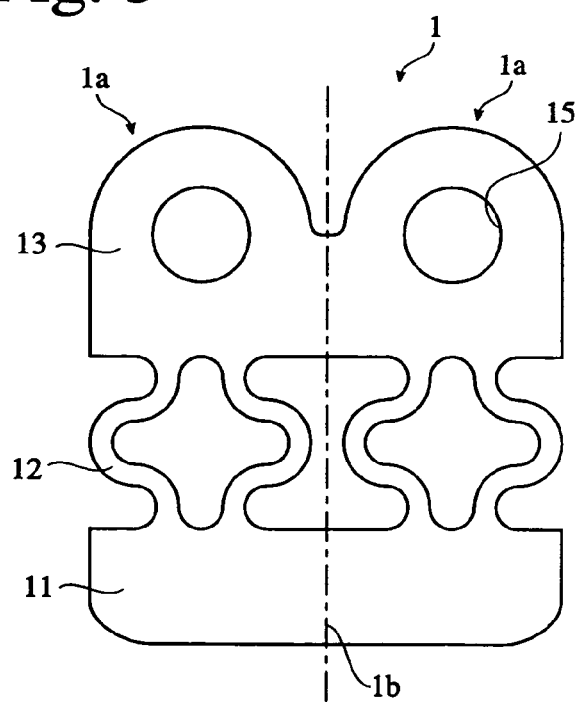
FIG. 3 is a development view showing the terminal member of FIG. 2, which is developed along a folding line.

In one preferred embodiment shown in FIGS. 2-5, the terminal member 1 is formed by a thin metal plate piece having a pair of parts of the same shape connected along one end line, and each thin metal plate piece 1a, 1a has a shape having portions corresponding to a tip end portion 11, an elastic support portion 12 and a fulcrum portion 13. This terminal member 1 is formed by punching a thin metal plate to provide a thin metal plate piece having a pair of terminal member shapes connected at one end, as shown in FIG. 3, and folding the thin metal plate pieces 1a, 1a along a center portion 1b.

Figure 5:
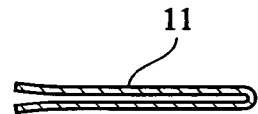
FIG. 5 is a cross-sectional view taken along the line B-B' in FIG. 2.

When the thin metal plate pieces 1a, 1a are folded, the center portion 1b is caused to have a semicircular cross section to provide a small gap between a pair of thin metal plate pieces 1a, 1a, so that the terminal member 1 has a substantially U-shaped cross section as shown in FIG. 5. With the substantially U-shaped cross section shape, a voltage-measuring terminal 121 of a separator plate can be inserted into the gap of the tip end portion 11, and a voltage-inputting terminal 123 of a voltage-measuring apparatus can be inserted into the gap of the fulcrum portion 13. For reference, FIG. 2 partially shows the voltage-measuring terminal 121 and the voltage-inputting terminal 123. To make the insertion of the terminal easy, open ends of the tip end portion 11 and the fulcrum portion 13 of the terminal member 1 are preferably slightly expanded as shown in FIG. 5. With this expanded shape, the voltage-measuring terminal 121 and the voltage-inputting terminal 123 can easily be inserted into the terminal member 1.

In this embodiment, the elastic support portion 12 is constituted by a pair of outward curved narrow-width strip portions 12a, 12a. Because each strip portion 12a, 12a is narrow in width and curved, the terminal member 1 is easily deformed, so that the terminal members 1 can follow the displacement of the separator plates not only in a stack direction but also in two directions in perpendicular to the stack direction, when connected to a large number of the stacked separator plates. Particularly in the case of a fuel cell stack comprising a large number of separator plates, the displacement and irregular positioning of the separator plates in a stack direction are unavoidable. Accordingly, with the elastic support portion 12 easily deformable in a stack direction, the terminal member 1 of the present invention can always keep sure connection to the voltage-measuring terminal 121 of a separator plate and the voltage-inputting terminal 123 of a voltage-measuring apparatus.

Figure 4A:
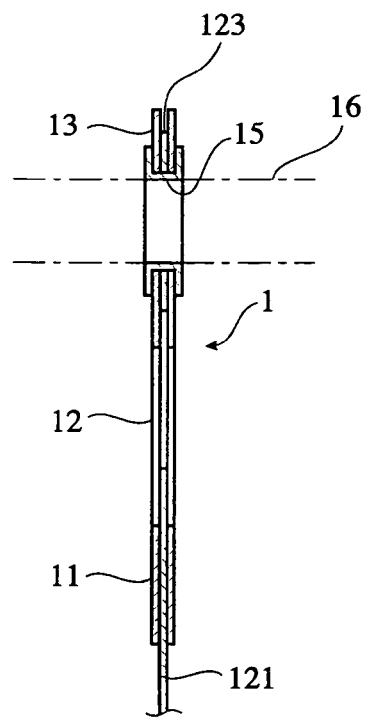
FIG. 4(a) is a cross-sectional view taken along the line A-A' in FIG. 2.
Figure 4B:
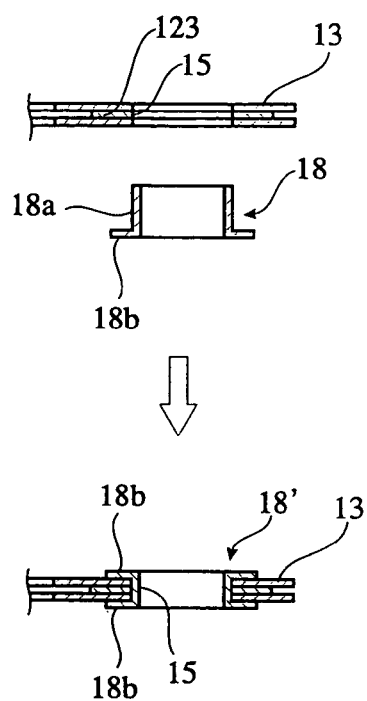
FIG. 4(b) is a partial cross-sectional view showing the mounting of an eyelet to a terminal member.

As shown in FIGS. 3 and 4, the fulcrum portion 13 has an opening 15 at a fulcrum position. This opening 15 is aligned with the opening of the voltage-inputting terminal 123 of the voltage-measuring apparatus, and firmly connected thereto via an eyelet 18. As shown in FIG. 4(b), the eyelet 18 comprises a tube portion 18a, which is inserted into the opening 15 of the fulcrum portion 13, and a flange portion 18b for fixing the tube portion 18a. After inserting the tube portion 18a of the eyelet 18 into the opening 15, the tip end portion of the tube portion 18a is expanded by pressure by a tool to form flange portions 18b, 18b at both ends of the tube portion 18a, whereby the eyelet 18 is firmly fixed to the opening 15.

In order that the terminal member 1 functions as a fulcrum when rotated, an insulating shaft 16 may penetrate through the opening of the eyelet 18, or through the opening 15 of the terminal member 1 without using the eyelet 18. Thus, the terminal member 1 can be positioned precisely to the voltage-measuring terminal 121 of the separator plate and the voltage-inputting terminal 123 of the voltage-measuring apparatus 10. Incidentally, the insulating shaft 16 may be a plastic rod, etc.

Figure 6A:
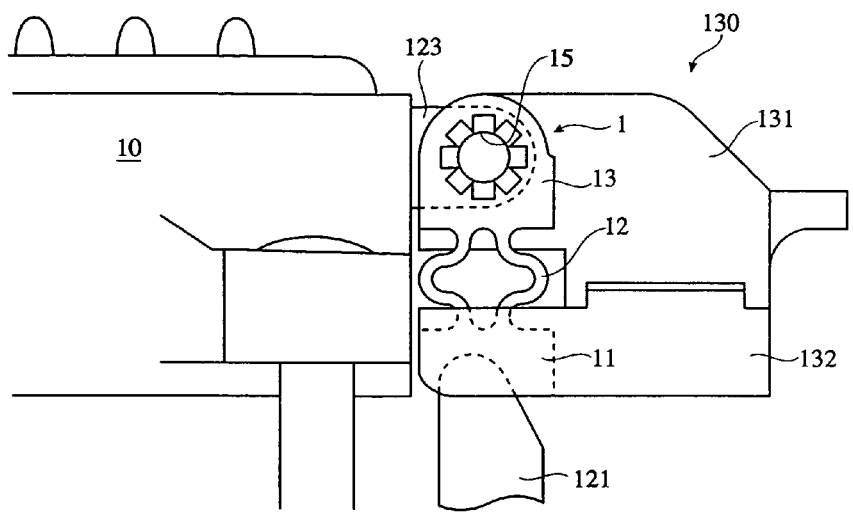
FIG. 6(a) is a partial enlarged view showing the details of the connection of the terminal members of the present invention to voltage-measuring terminals of separator plates and voltage-inputting terminals of a voltage-measuring apparatus with casings.
Figure 6B:
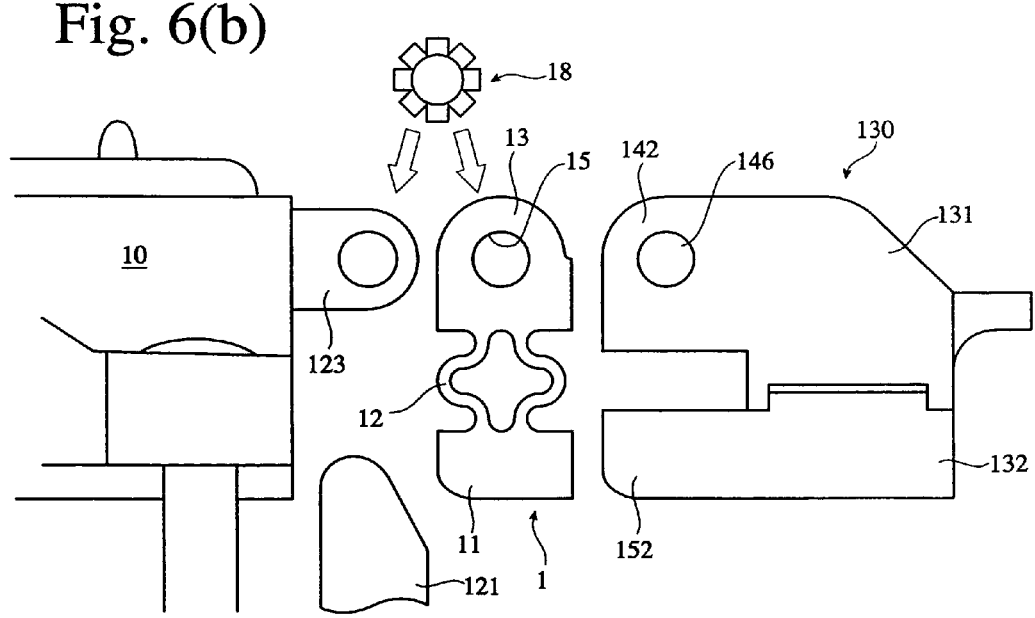
FIG. 6(b) is an exploded view of FIG. 6(a)

FIG. 6 shows in detail the relation between the terminal member 1 connected to the voltage-measuring terminal 121 of the separator plate and the voltage-inputting terminal 123 of the voltage-measuring apparatus, and the casing 130. The casing 130 is constituted by an upper casing 131 and a lower casing 132 both made of plastics, the upper casing 131 supporting the fulcrum portion 13 of the terminal member 1 connected to the voltage-inputting terminal 123 of the voltage-measuring apparatus 10, and the lower casing 132 supporting the tip end portion 11 of the terminal member 1 connected to the voltage-measuring terminal 121 of the separator plate.

Figure 7:
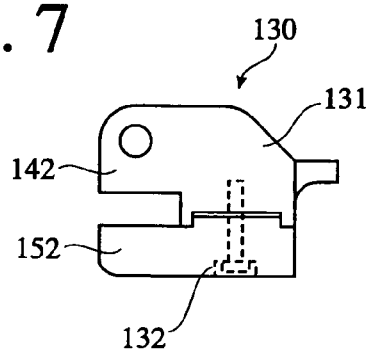
FIG. 7 is a side view showing a casing to which the terminal member of the present invention is mounted.
Figure 8:
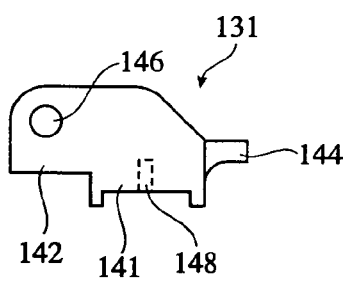
FIG. 8 is a side view showing an upper casing.
Figure 9:
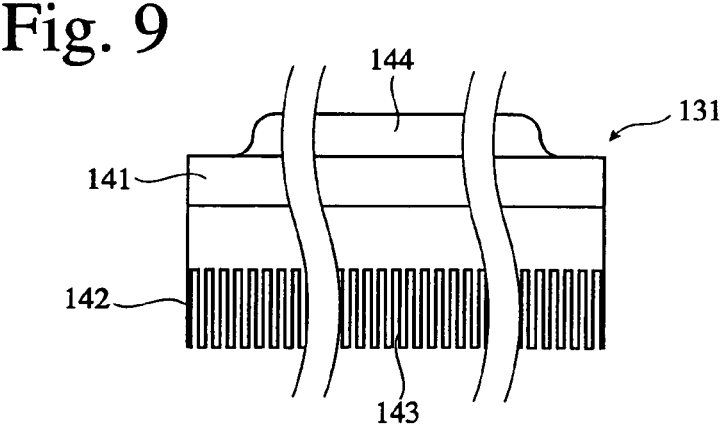
FIG. 9 is a plan view showing an upper casing.
Figure 10:
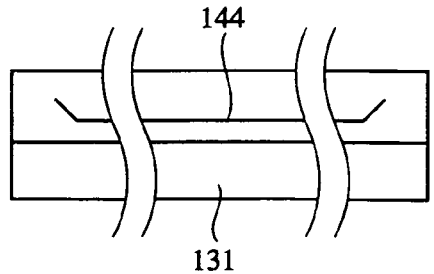
FIG. 10 is a rear view showing an upper casing.

FIG. 7 is a side view of an insulating casing 130, and FIG. 8 is a side view of an upper casing 131. FIG. 9 is a plan view of the upper casing 131, and FIG. 10 is a rear view of the upper casing 131. As is clear from FIGS. 8-10, the upper casing 131 comprises an integral body portion 141, teeth 142 having a plurality of narrow-width slits 143 integrally formed in a forward portion of the body portion 141 for preventing the adjacent terminal members 1 from being in contact with each other, and a ridge portion 144 integrally formed on a rear surface of the body portion 141. The pitch of the slits 143 is the same as the pitch of the terminals 121, 123 to be connected in a stack direction. The ridge portion 144 functions as a handle for rotating the casing 130. The teeth 142 are provided with through-holes 146 in a longitudinal direction. The body portion 141 is provided with a threaded hole 148 opening on a bottom surface.

Figure 11:
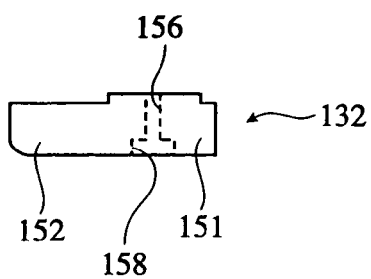
FIG. 11 is a side view showing a lower casing.
Figure 12:
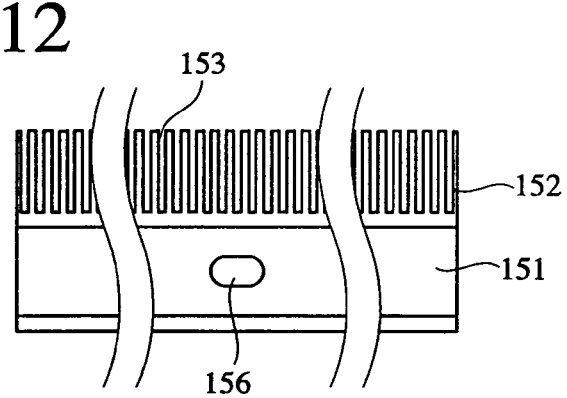
FIG. 12 is a plan view showing a lower casing.
Figure 13:
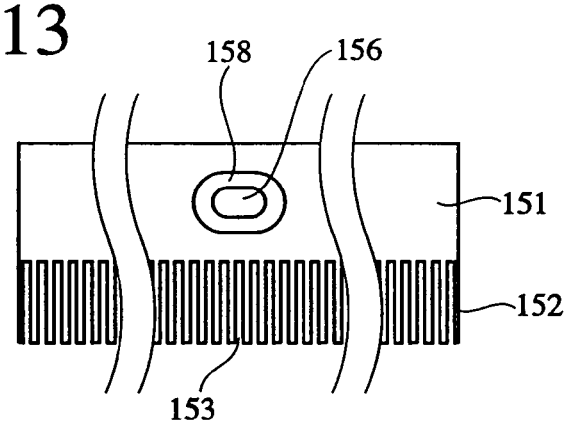
FIG. 13 is a bottom view showing a lower casing.
Figure 14:
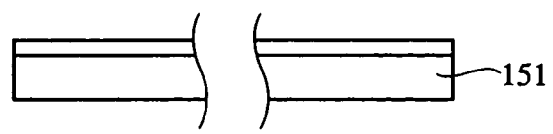
FIG. 14 is a rear view showing a lower casing.

FIG. 11 is a side view of the lower casing 132, FIG. 12 is its plan view, FIG. 13 is its bottom view, and FIG. 14 is its rear view. The lower casing 132 comprises an integral body portion 151, teeth 152 having a plurality of narrow-width slits 153 integrally formed in a front portion of the body portion 151 for preventing the adjacent terminal members 1 from being in contact with each other. The pitch of the slits 153 is the same as the pitch of the slit 143. The body portion 151 is provided with a hole 156 having a unidirectionally extended circular cross section at a position corresponding to the threaded hole 148 of the upper casing 131, and the opening of the unidirectionally extended circular hole 156 on a bottom surface is provided with a recess 158 for receiving a screw head. The teeth 152 are located at positions corresponding to the teeth 142 of the upper casing 131. Each slit 143, 153 of the teeth 142, 152 should be aligned precisely. Accordingly, a hole 156 having a unidirectionally extended circular cross section makes it possible to adjust the position of the lower casing 132 relative to the upper casing 131 in a longitudinal direction (stack direction of the fuel cell stack).

Figure 15:
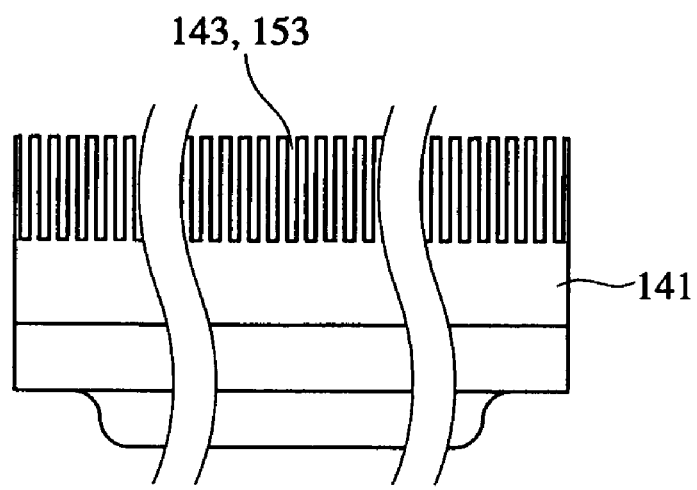
FIG. 15 is a plan view showing a casing assembled by screwing an upper casing to a lower casing.
Figure 16:
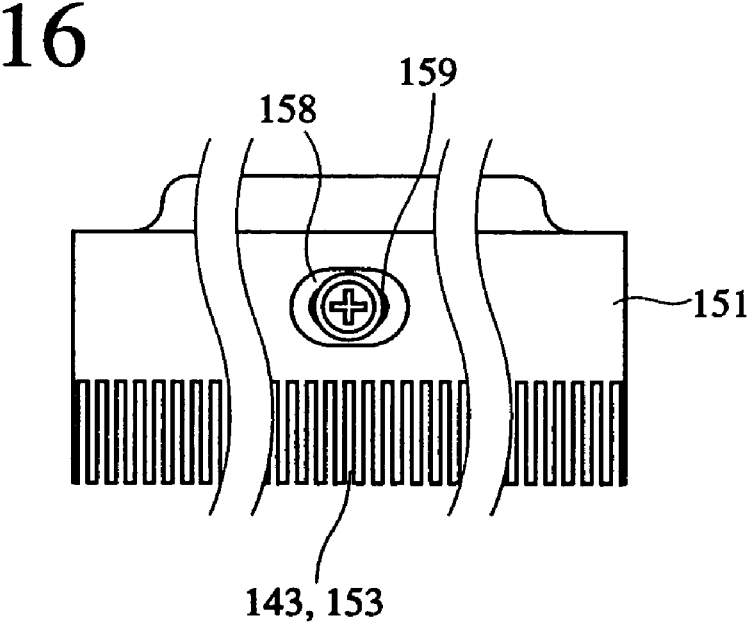
FIG. 16 is a bottom view showing casing assembled by screwing an upper casing to a lower casing.

As shown in FIG. 7, when the upper casing 131 is fixed to the lower casing 132 by a screw 159, both teeth 142, 152 are positioned on the same side, with the slits 143, 153 aligned. What is viewed from above is as shown in the plan view of FIG. 15, and what is viewed from below is as shown in the bottom view of FIG. 16.

Figure 17A:
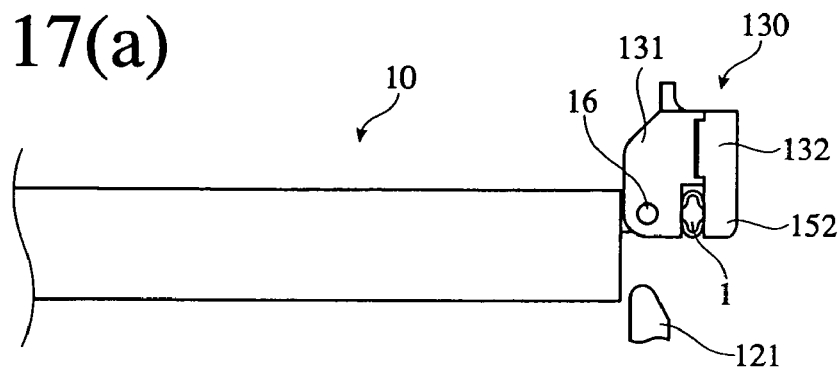
FIG. 17(a) is a schematic view showing the connection of a terminal member mounted to the casing to a voltage-inputting terminal together with the upper teeth of the casing.
Figure 17B:
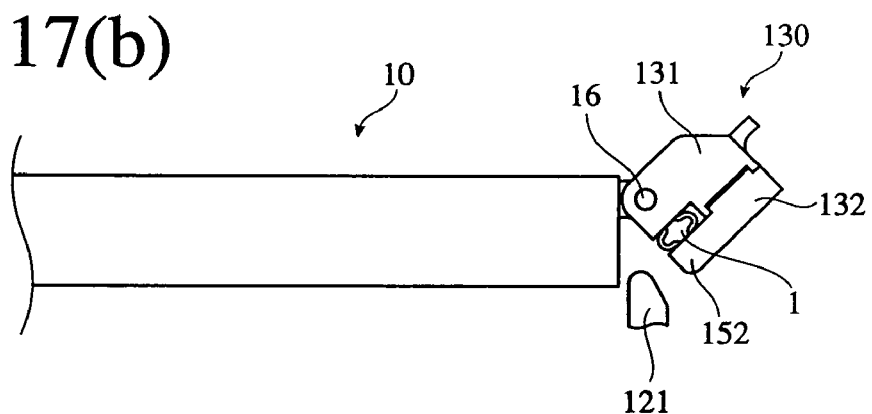
FIG. 17(b) is a schematic view showing the rotation of a terminal member mounted to the casing around a shaft of a fulcrum portion engaging the voltage-inputting terminal.
Figure 17C:
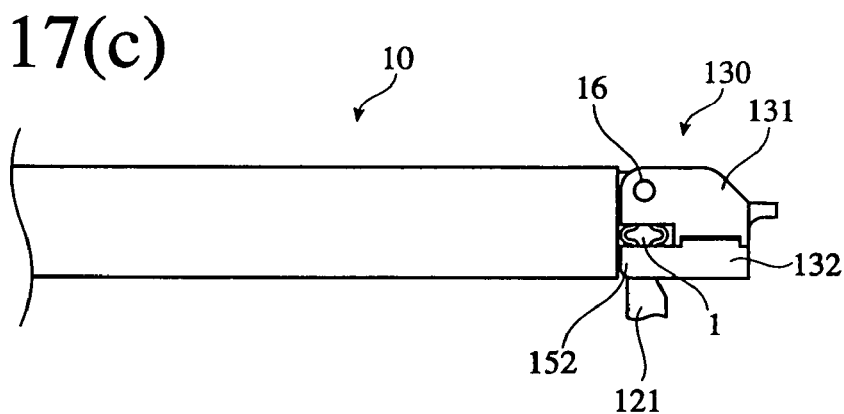
FIG. 17(c) is a schematic view showing a terminal member connected to a voltage-measuring terminal together with the lower teeth of a casing by the rotation of the terminal member mounted to the casing.
Figure 18A:
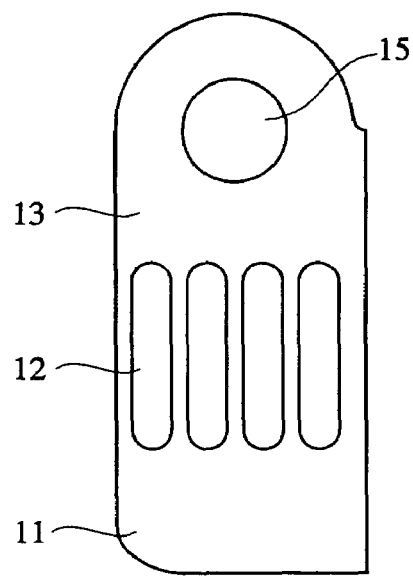
FIG. 18(a) is a front view showing another example of the terminal member of the present invention.
Figure 18B:
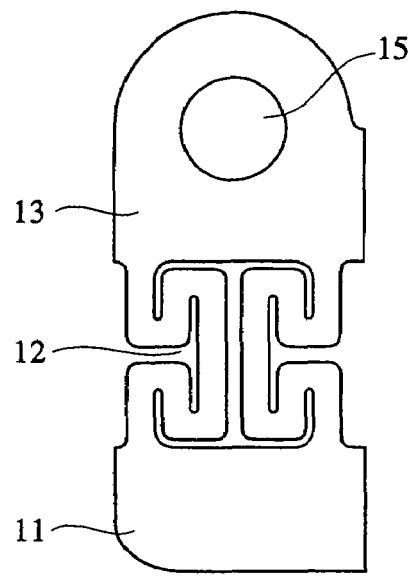
FIG. 18(b) is a front view showing a further example of the terminal member of the present invention.
Figure 18C:
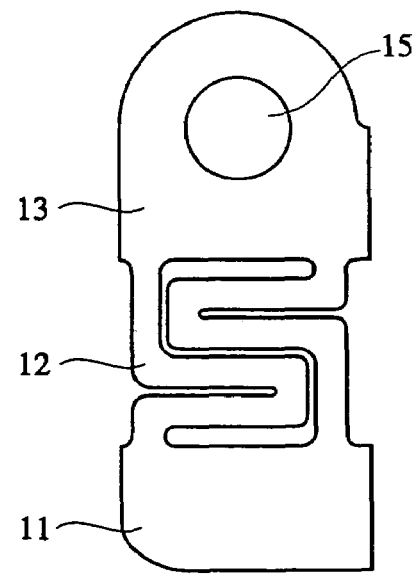
FIG. 18(c) is a front view showing a further example of the terminal member of the present invention.
Figure 18D:
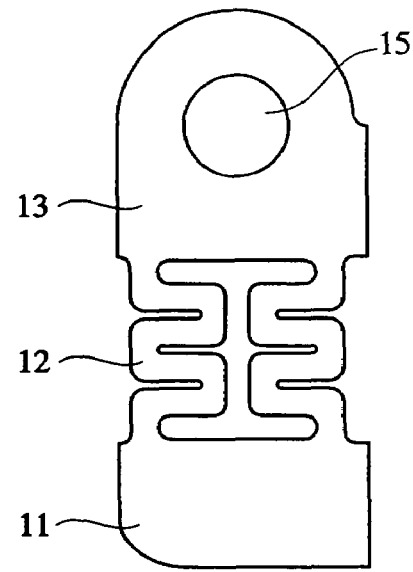
FIG. 18(d) is a front view showing a further example of the terminal member of the present invention.

FIGS. 17(a)-(c) show a method for connecting a large number of terminal members 1 to voltage-measuring terminals 121 of separator plates and voltage-inputting terminals 123 of a voltage-measuring apparatus 10 at a time using an insulating casing 130. First, as shown in FIG. 17(a), the teeth 143 of the upper casing 131 engage a row of voltage-inputting terminals 123 in a state where each terminal member 1 is inserted into a slit of the insulating casing 130, and each voltage-inputting terminal 123 is inserted into a gap having a U-shaped cross section of the fulcrum portion 13 of each terminal member 1. With the opening 15 of the fulcrum portion 13, the opening 125 of the voltage-inputting terminal 123, and the opening 146 of the upper casing 131 precisely aligned, the casing 130 supporting the terminal member 1 is rotatable around the openings 15, 146 as a fulcrum. If necessary, the insulating shaft 16 may be inserted into the openings 15, 146, so that it penetrates through all the openings 15, 146 aligned in a stack direction, to make the casing 130 supporting the terminal members 1 rotatable around the shaft 16.

Next, as shown in FIG. 17(b), the casing 130 holding the terminal members 1 is rotated around the shaft 16 to engage the teeth 152 of the lower casing 132 to the voltage-measuring terminals 121 of the separator plates, thereby inserting each voltage-measuring terminal 121 into a gap with a U-shaped cross section of the tip end portion 11 of each terminal member 1. FIG. 17(c) shows a state where each voltage-measuring terminal 121 of the separator plate is completely inserted into a gap with a U-shaped cross section of the tip end portion 11 of each terminal member 1.

As is clear from FIG. 6, the tip end portion 11 of each terminal member 1 sandwiches the voltage-measuring terminal 121 of the separator plate, and the fulcrum portion 13 sandwiches the voltage-inputting terminal 123 of the voltage-measuring apparatus 10, whereby each voltage-measuring terminal 121 is connected to each voltage-inputting terminal 123. At this time, the opening 15 of the fulcrum portion 13 is aligned with the opening 146 of the teeth 142 of the upper casing 131, and the insulating shaft 16 penetrate through both openings. Accordingly, the terminal members 1 inserted into the slits of the teeth 142, 152 of the casing 130 are rotated with precise positioning, whereby their tip end portions 11 are surely connected to the voltage-measuring terminals 121 of the separator plates.

In a state where the terminal members 1 are connected to all the voltage-measuring terminals 121 of the separator plates and all the voltage-inputting terminals 123 of the voltage-measuring apparatus 10 using the casing 130, each tooth 142, 152 of the casing 130 acts as a separator for insulating the adjacent terminal members 1. Therefore, there is no likelihood of error in detected voltage, which is caused by direct contact of the terminal members 1.

FIGS. 18(a)-(d) show various modifications of the terminal member 1 of the present invention. Though every terminal member 1 has a tip end portion 11 and a fulcrum portion 13 both having substantially the same shape, their elastic support portions 12 have different shapes. In an example of FIG. 18(a), the elastic support portion 12 is constituted by a plurality of elongated narrow strip portions. In examples of FIGS. 18(b)-(d), any elastic support portions 12 are constituted by a pair of curved narrow-width strip portions. The curved strip portions are more preferable, because they can easily follow displacement and irregular positioning in vertical and lateral directions on the figure, particularly in a stack direction.

Figure 19A:
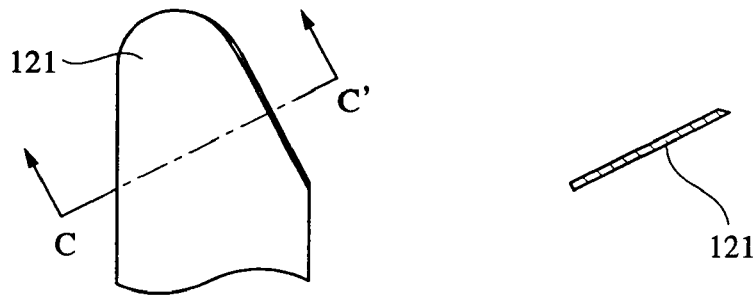
FIG. 19(a) is a partial front view and a cross-sectional view showing one example of the terminal member of the present invention for sandwiching a projection terminal of a separator plate.
Figure 19B:
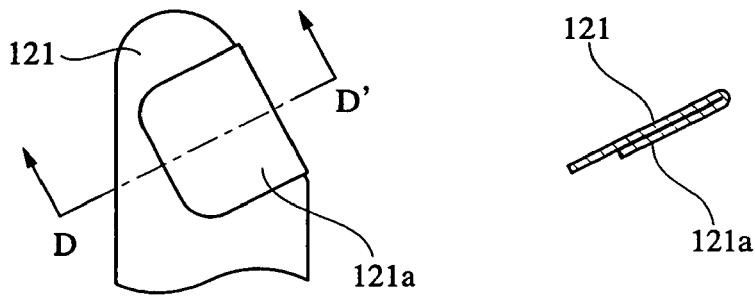
FIG. 19(b) is a partial front view and a cross-sectional view showing another example of the terminal member of the present invention for sandwiching a projection terminal of a separator plate.
Figure 19C:
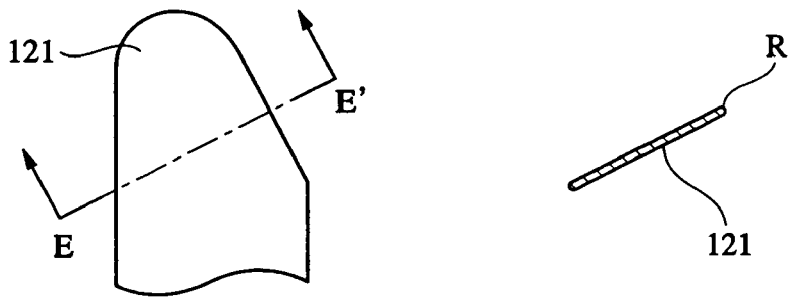
FIG. 19(c) is a partial front view and a cross-sectional view showing a further example of the terminal member of the present invention for sandwiching a projection terminal of a separator plate.

FIGS. 19(a)-(c) show various cross section shapes of voltage-measuring projection terminals 121 of separator plates. In an example of FIG. 19(a), the projection terminal 121 has a sharp edge portion on the side of first entering into a gap of the tip end portion 11 of the terminal member 1. In an example of FIG. 19(b), the projection terminal 121 has a round-shaped edge portion constituted by a folded metal piece 121a on the side of first entering into a gap of the tip end portion 11 of the terminal member 1. In this example, the metal piece 121a of the projection terminal 121 needs only be folded, resulting in easy working. In example of FIG. 19(c), the projection terminal 121 has a round-chamfered edge portion on the side of first entering into a gap of the tip end portion 11 of the terminal member 1. With these shapes, the projection terminal 121 can surely and easily be inserted into the gap of the terminal member 1 having a U-shaped cross section.

Figure 20A:
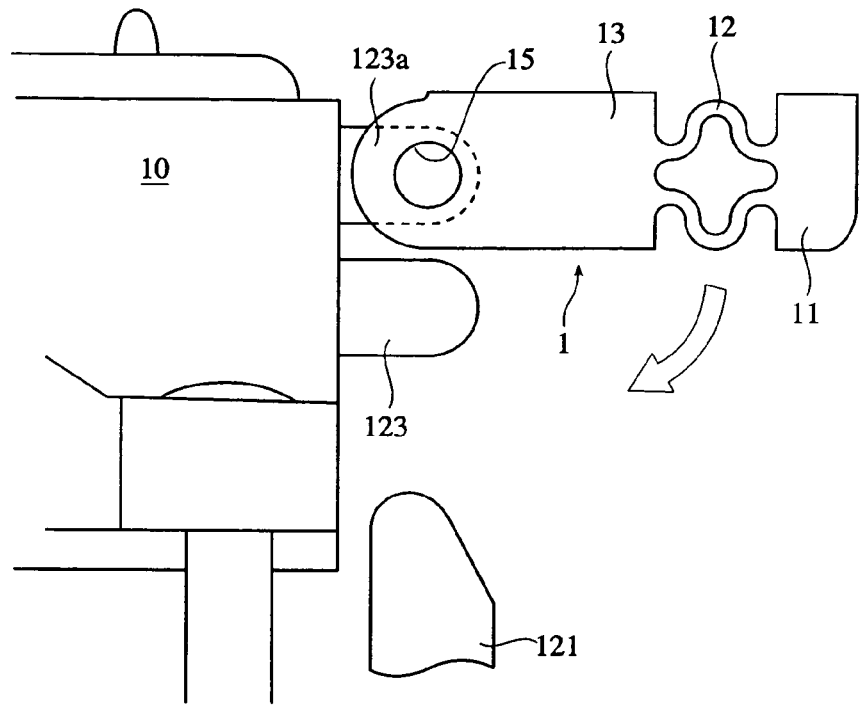
FIG. 20(a) is a schematic view showing another terminal member of the present invention before connected to a voltage-measuring terminal of a separator plate and voltage-inputting terminals of a voltage-measuring apparatus.
Figure 20B:
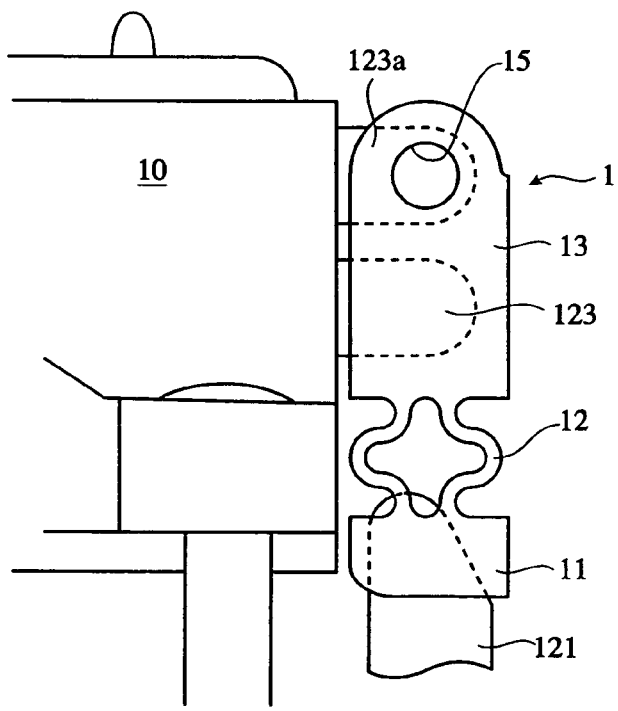
FIG. 20(b) is a schematic view showing another terminal member of the present invention connected to a voltage-measuring terminal of a separator plate and a voltage-inputting terminal of a voltage-measuring apparatus.

FIGS. 20(a), (b) show the details of connection of another terminal member of the present invention to a voltage-measuring terminal of a separator plate and a voltage-inputting terminal of a voltage-measuring voltage-measuring apparatus is separate from a projection 123a functioning as a fulcrum of the terminal member 1. Accordingly, the fulcrum portion 13 of the terminal member 1 has such length as to cover both of the projection 123a and the voltage-inputting terminal 123. With respect to other points, the terminal member 1 of FIG. 20 is the same as that of FIG. 2.

To connect the voltage-measuring terminal of the separator plate to the voltage-inputting terminal of the voltage-measuring apparatus by this terminal member 1, as shown in FIG. 20(a), the opening 15 of the terminal member 1 is first aligned with the opening of the projection 123a. The terminal member 1 is then rotated, so that a lower portion of the fulcrum portion 13 of the terminal member 1 sandwiches the voltage-inputting terminal 123, and that the tip end portion 11 sandwiches the voltage-measuring projection terminal 121.

Figure 21:
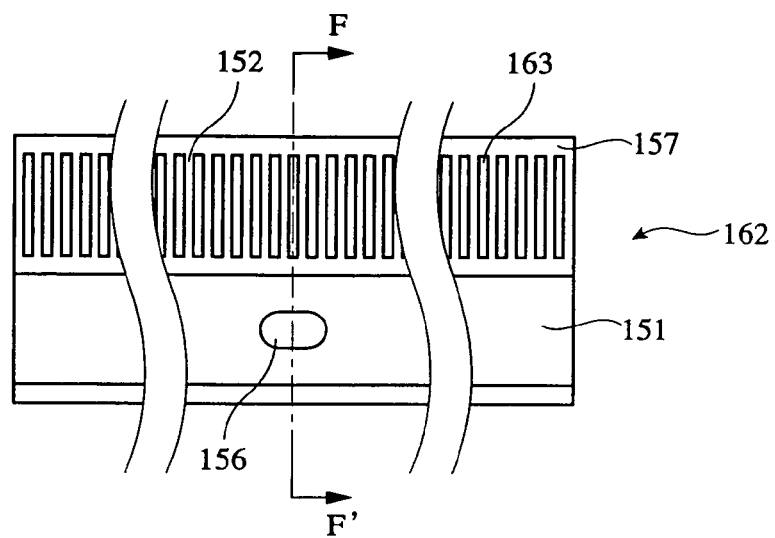
FIG. 21 is a plan view showing a further example of the lower casing of the present invention.
Figure 22:
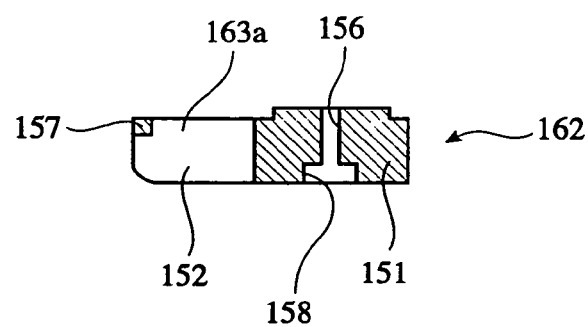
FIG. 22 is a cross-sectional view taken along the line F-F'' in FIG. 21.

FIGS. 21-23 show another example of the insulating casing. This insulating casing 160 comprises an upper casing 161 and a lower casing 162, the lower casing 162 comprising an integral body portion 151, and teeth 152 having a plurality of narrow-width slits 163 integrally formed in a front portion of the body portion 151 for preventing the adjacent terminal members 1 from being in contact with each other, and the open ends of the teeth 152 are partially closed by a horizontal portion 157 at upper ends. Accordingly, the teeth 152 are in the form of a slit in their upper portions and in the form of a comb in their lower portion. Because the upper slit 163a should have sufficient length to receive the terminal members 1, the upper slits 163a is substantially the same in length as the slit 153 of the lower casing 132 shown in FIGS. 11-14. With respect to other points, the lower casing 162 is the same as that shown in FIGS. 11-14. Also, the upper casing 161 is the same as that shown in FIGS. 8-10, except that the former has longer teeth than the latter by the horizontal portion 157.

Figure 23A:
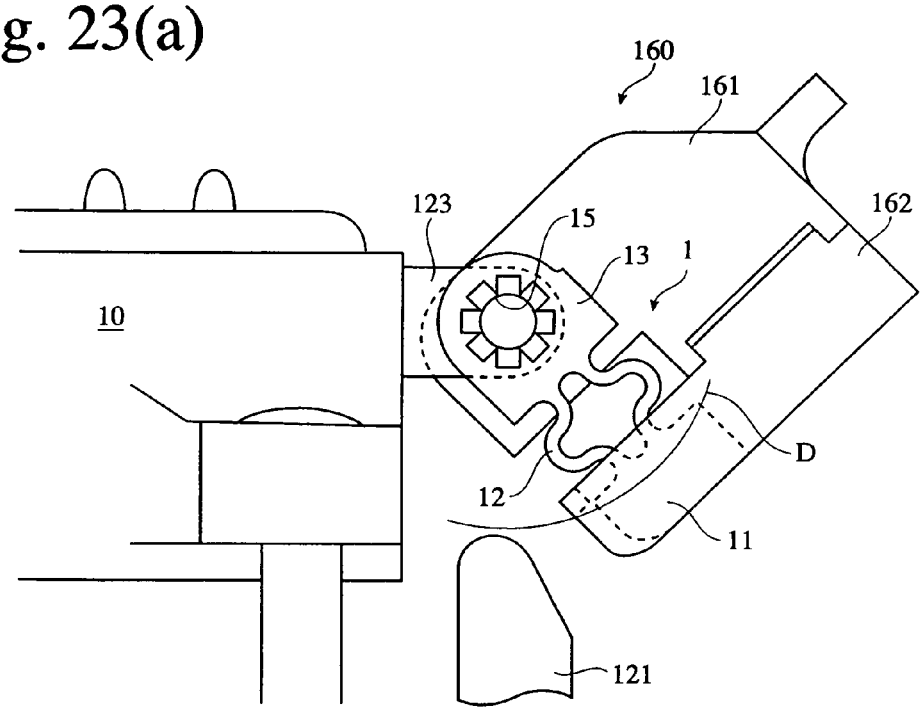
FIG. 23(a) is a schematic view showing the terminal member of the present invention shown in FIGS. 21 and 22 with a still different casing before connected to a voltage-measuring terminal of a separator plate.
Figure 23B:
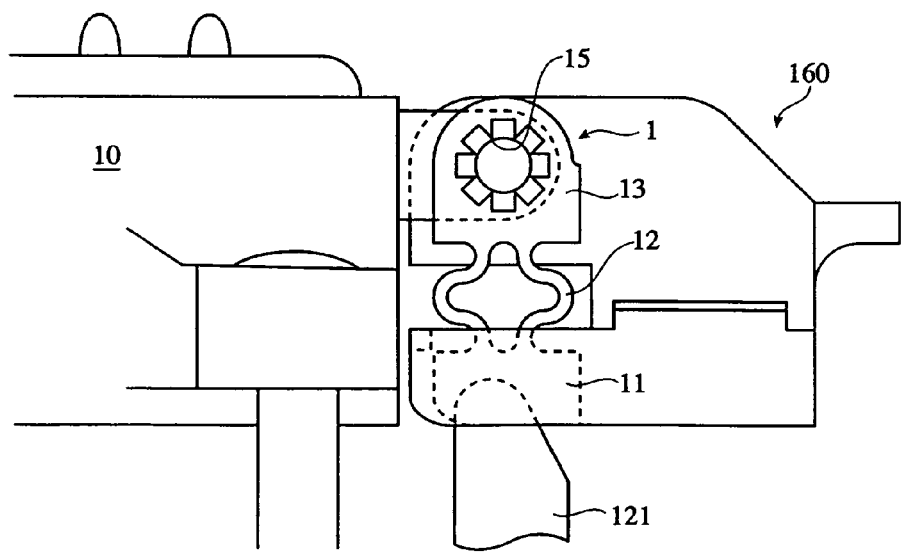
FIG. 23(b) is a schematic view showing a terminal member connected to a voltage-measuring terminal of a separator plate with the above casing.
Figure 24:
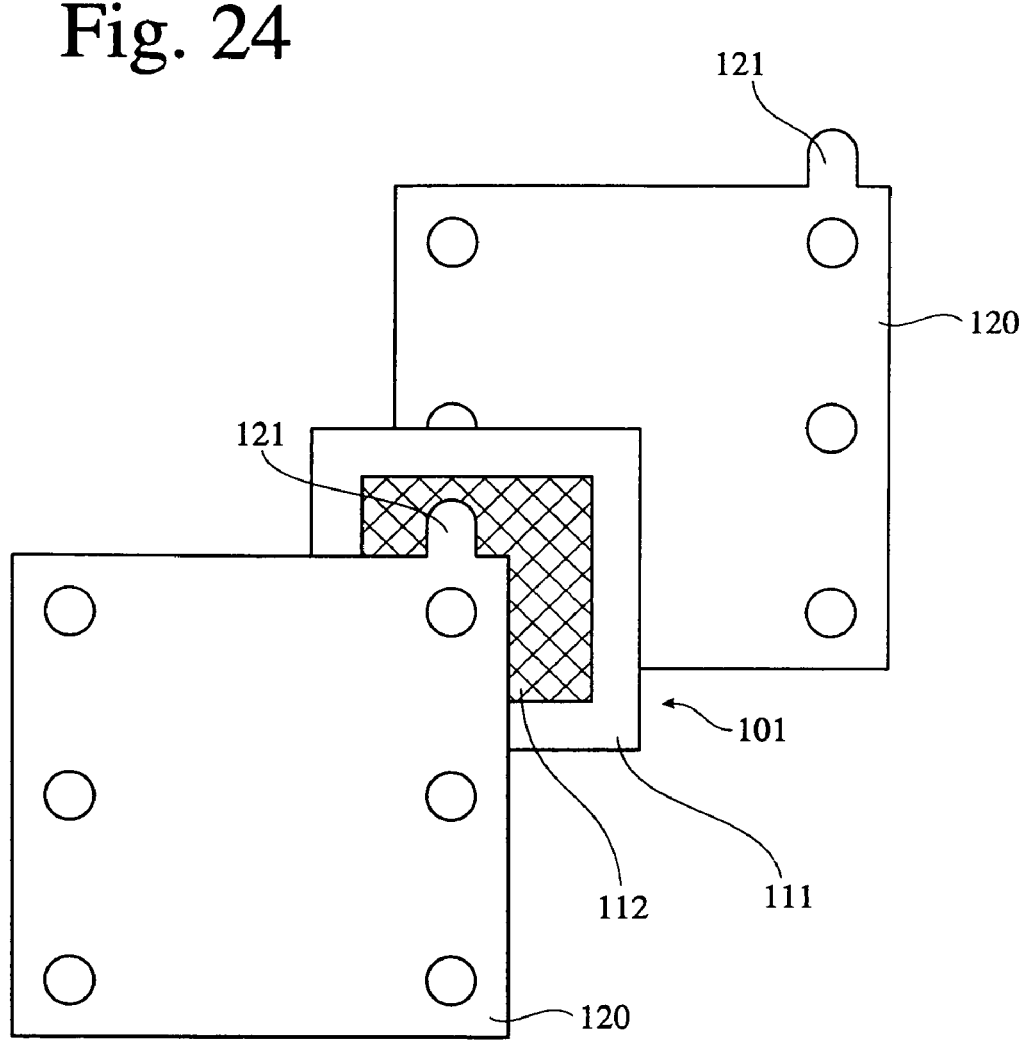
FIG. 24 is a front view showing the cell structure constituting a fuel cell stack.

To connect the voltage-measuring terminals 121 of the separator plates to the voltage-inputting terminals 123 of the voltage-measuring apparatus 10 using the terminal members 1 and the insulating casing 160 as shown in FIG. 23(a), in a state where each terminal member 1 is inserted into the slits of the upper and lower casings 161, 162 of the insulating casing 160, the teeth of the upper casing 161 are first engaged to a row of the voltage-inputting terminals 123 to insert each voltage-inputting terminal 123 into the U-shaped cross section gap of the fulcrum portion 13 of each terminal member 1. When the opening 15 of the fulcrum portion 13, the opening 125 of the voltage-inputting terminal 123, and the opening of the upper casing 161 are precisely aligned, the casing 160 supporting the terminal member 1 is rotatable around the openings 15, 146 as a fulcrum. Because the lower end of the horizontal portion 157 of the lower casing 162 passes along a circular locus D around the openings 15, 146 as a center, the horizontal portion 157 is not brought into contact with the voltage-measuring projection terminal 121 when the casing 160 is rotated. With such structure, the tip end portion 11 of the terminal member 1 can be connected to the voltage-measuring projection terminal 121 simply by rotating the casing 160 as shown in FIG. 23(b).

To detach the terminal members 1, the casing 160 need only be rotated in an opposite direction. Because the tip end portions 11 of the terminal members 1 engage the horizontal portion 157 of the lower casing 162, the terminal members 1 are rotated simultaneously. Accordingly, all the terminal members 1 can be detached by one operation.

Because the terminal member of the present invention has a shape in which a tip end portion and a fulcrum portion each having a U-shaped cross section to sandwich each terminal are integrally connected via an elastic support portion, the positioning of terminals would easily be achieved, even if there were differences in position between a large number of voltage-measuring terminals of the stacked separator plates and the voltage-inputting terminals of the voltage-measuring apparatus in a stack direction due to the unevenness of separator plate thickness, etc. Also, even if there are the vibration of the fuel cell stack and its thermal expansion due to heat generation, etc., large displacement of terminals can surely be absorbed. Therefore, there is no likelihood of insufficient connection and excess stress applied to the voltage-measuring terminals, resulting in a fuel cell stack of high reliability. Such feature is particularly important to a fuel cell stack comprising several tens to several hundreds of separator plates for high output.

Because the terminal member of the present invention having a U-shaped cross section can be connected to the voltage-inputting terminals of the voltage-measuring apparatus in a sandwiching manner in a state where it is mounted to the casing having teeth, and then rotated around the terminals as a fulcrum to be brought into contact with the voltage-measuring terminals of the separator plates in a sandwiching manner, a large number of terminal members can advantageously be connected by one operation.

Because the fuel cell stack of the present invention comprises insulating casing having a plurality of partitions for supporting each terminal member in an insulated state, the adjacent terminal members can surely be prevented from being in contact with each other, and a plurality of terminal members can be supported by the insulating casing at the same time, whereby the voltage-measuring projection terminals of a large number of thin metal separator plates can surely be connected to the voltage-inputting terminals of the voltage-measuring apparatus by one operation.

The above feature of the present invention eliminates the burden of connecting each terminal with a cable with connectors as in the conventional technologies, thereby providing a fuel cell stack excellent in handling.

Because the partitions of the insulating casing are constituted by a plurality of comb teeth, the positioning of the terminal members can be carried out easily and surely by inserting the terminal members into each gap of a plurality of comb teeth, while surely preventing a plurality of terminal members from being in contact with each other. In addition, because the upper casing and the lower casing of the insulating casing can be adjusted in a stack direction, the differences in position between the voltage-measuring projection terminals of the separator plates and the voltage-inputting terminals of the voltage-measuring apparatus in a stack direction can be absorbed.

With the terminal members having fulcrum portions engaging the comb teeth of the upper casing and tip end portions engaging the comb teeth of the lower casing with an elastic support portion not substantially engaging any of the upper casing and lower casing, the differences in position between the voltage-measuring projection terminals of the separator plates and the voltage-inputting terminals of the voltage-measuring apparatus in a stack direction position, if any, can be absorbed. Further, with the lower casing having slits whose upper portions are closed, the terminal member can be detached by one rotation operation.

What is claimed is:

1. An integral terminal member for connecting voltage-measuring projection terminals on peripheries of separator plates and voltage-inputting terminals of a voltage-measuring apparatus in a fuel cell stack, comprising (a) a tip end portion to be connected to a projection terminal of said separator plate, and (b) an elastic support portion connected to said tip end portion, said terminal member having two symmetrical parts foldable about a central axis:

wherein said terminal member has a substantially U-shaped cross-section when said two symmetrical parts are folded about said central axis, and wherein said tip end portion is connected to said projection terminal of said separator plate in a sandwiching manner.

2. The terminal member according to claim 1, wherein said elastic support portion comprises narrow-width strip portions.

3. The terminal member according to claim 2, wherein said elastic support portion comprises a plurality of curved strip portions.

4. The terminal member according to claim 1, further comprising a fulcrum portion connected to said elastic support portion and to be connected to at least one of said voltage-inputting terminals.

5. The terminal member according to claim 4, wherein said fulcrum portion has an opening at a fulcrum position.

* * * * *